United States Patent
Davis et al.

(10) Patent No.: US 9,957,827 B2
(45) Date of Patent: May 1, 2018

(54) CONFORMAL SEAL

(71) Applicant: UNITED TECHNOLOGIES CORPORATION, Farmington, CT (US)

(72) Inventors: Timothy M Davis, Kennebunk, ME (US); Paul M Lutjen, Kennebunkport, ME (US); Mark J. Rogers, Kennebunk, ME (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days. days.

(21) Appl. No.: 14/830,771

(22) Filed: Aug. 20, 2015

(65) Prior Publication Data
US 2016/0115811 A1  Apr. 28, 2016

Related U.S. Application Data

(60) Provisional application No. 62/068,529, filed on Oct. 24, 2014.

(51) Int. Cl.
| | | |
|---|---|---|
| *F01D 11/00* | (2006.01) | |
| *F16J 15/08* | (2006.01) | |
| *F16J 15/10* | (2006.01) | |

(52) U.S. Cl.
CPC ......... *F01D 11/005* (2013.01); *F16J 15/0887* (2013.01); *F16J 15/104* (2013.01); *F05D 2220/32* (2013.01); *F05D 2240/55* (2013.01)

(58) Field of Classification Search
CPC ............. F16J 2015/0837; F02F 11/002; F05D 2250/75; F05D 2240/11; F01D 11/005; F01D 11/003
See application file for complete search history.

(56) References Cited

U.S. PATENT DOCUMENTS

| | | | | |
|---|---|---|---|---|
| 2,631,908 A | * | 3/1953 | Teetor | F16J 9/203 277/462 |
| 3,272,521 A | * | 9/1966 | McNenny | F16J 15/3236 277/467 |
| 3,857,572 A | * | 12/1974 | Taylor | F16J 15/0887 277/609 |
| 4,121,843 A | * | 10/1978 | Hailing | F01D 11/005 277/647 |
| 4,199,151 A | * | 4/1980 | Bartos | F01D 11/005 277/306 |

(Continued)

FOREIGN PATENT DOCUMENTS

EP    0130867 A1    1/1985

OTHER PUBLICATIONS

English Abstract for EP0130867A1—Jan. 9, 1985; 1 pg.
European Search Report for Application No. 15191224.3-1751; dated: Apr. 1, 2016; 5 pgs.

*Primary Examiner* — Eugene G Byrd
(74) *Attorney, Agent, or Firm* — Cantor Colburn LLP

(57) ABSTRACT

The present disclosure relates generally to a sliding seal between two components. The sliding seal includes a first seal section and an adjacent second seal section, each including a base and two extending legs defining respective first and second ends of the seal. At least the first seal section includes a first plurality of slots extending from the first end to the base and a second plurality of slots extending from the second end to the base.

10 Claims, 7 Drawing Sheets

(56) References Cited

U.S. PATENT DOCUMENTS

| | | | | |
|---|---|---|---|---|
| 4,602,795 A * | 7/1986 | Lillibridge | F16J 15/0887 | 277/644 |
| 4,602,888 A * | 7/1986 | Court | F16J 15/0887 | 267/1.5 |
| 4,645,217 A * | 2/1987 | Honeycutt, Jr. | F01D 11/005 | 277/555 |
| 4,759,555 A * | 7/1988 | Hailing | F16J 9/18 | 277/631 |
| 4,798,392 A * | 1/1989 | Tozer | F16J 15/0887 | 277/644 |
| 4,854,600 A * | 8/1989 | Hailing | F16J 15/021 | 277/626 |
| 5,240,263 A * | 8/1993 | Nicholson | F16J 15/0893 | 219/137 R |
| 5,249,814 A * | 10/1993 | Hailing | F16J 15/0887 | 228/214 |
| 5,630,593 A * | 5/1997 | Swensen | F16J 15/0887 | 277/626 |
| 5,657,998 A * | 8/1997 | Dinc | F01D 11/005 | 277/653 |
| 5,716,052 A | 2/1998 | Swensen et al. | | |
| 6,199,871 B1 * | 3/2001 | Lampes | F01D 11/005 | 277/614 |
| 6,237,921 B1 * | 5/2001 | Liotta | F01D 11/005 | 277/630 |
| 6,299,178 B1 * | 10/2001 | Halling | F16J 15/0887 | 277/644 |
| 6,352,267 B1 * | 3/2002 | Rode | F16J 15/0887 | 277/631 |
| 6,588,761 B2 * | 7/2003 | Halling | F16L 23/16 | 277/312 |
| 7,080,513 B2 * | 7/2006 | Reichert | F01D 9/023 | 277/628 |
| 7,090,459 B2 * | 8/2006 | Bhate | F01D 11/025 | 277/581 |
| 7,101,147 B2 * | 9/2006 | Balsdon | F01D 11/005 | 277/642 |
| 7,152,864 B2 * | 12/2006 | Amos | F01D 11/005 | 277/650 |
| 7,316,762 B2 * | 1/2008 | Lah | C10B 25/10 | 202/242 |
| 7,497,443 B1 * | 3/2009 | Steinetz | F16J 15/0887 | 277/644 |
| 7,665,953 B2 * | 2/2010 | Lee | F01D 9/04 | 415/1 |
| 8,651,497 B2 * | 2/2014 | Tholen | F01D 11/005 | 277/644 |
| 9,103,225 B2 * | 8/2015 | Lutjen | F01D 11/08 | |
| 9,140,388 B2 * | 9/2015 | Baca | F16J 15/025 | |
| 9,169,930 B2 * | 10/2015 | Panchal | F16J 15/3284 | |
| 2004/0239053 A1 | 12/2004 | Rowe et al. | | |
| 2009/0243228 A1 * | 10/2009 | Heinemann | F01D 11/005 | 277/595 |
| 2012/0156029 A1 * | 6/2012 | Karafillis | F01D 11/08 | 415/213.1 |
| 2012/0195743 A1 * | 8/2012 | Walunj | F01D 11/006 | 415/174.5 |
| 2012/0200046 A1 | 8/2012 | Green et al. | | |
| 2013/0266416 A1 * | 10/2013 | Bergman | F01D 25/246 | 415/1 |
| 2014/0286751 A1 * | 9/2014 | Brunelli | F01D 11/24 | 415/116 |
| 2016/0003080 A1 * | 1/2016 | Mcgarrah | F01D 11/003 | 415/173.1 |

* cited by examiner

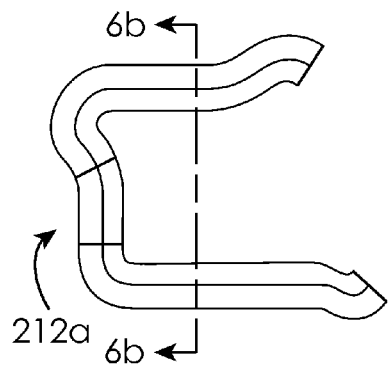 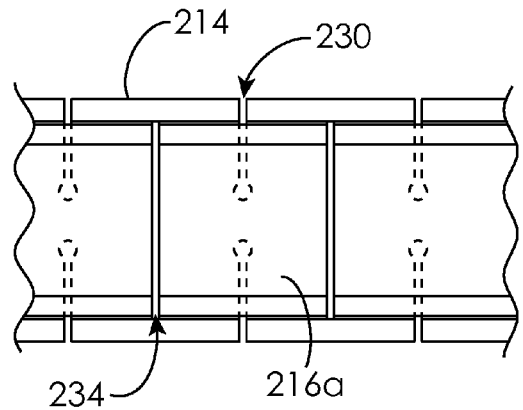
Fig. 6a    Fig. 6b
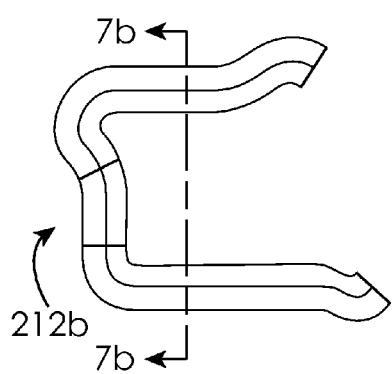 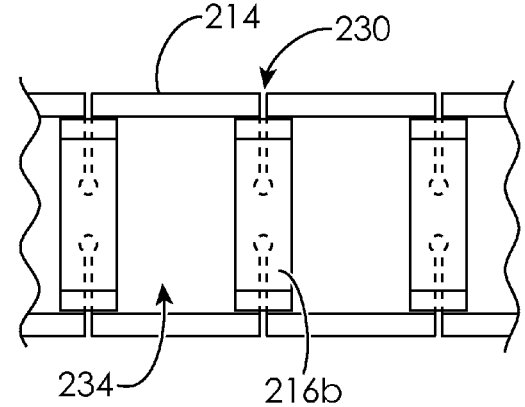
Fig. 7a    Fig. 7b

CONFORMAL SEAL

CROSS REFERENCE TO RELATED APPLICATION

This application claims the benefit of and incorporates by reference herein the disclosure of U.S. Ser. No. 62/068,529, filed Oct. 24, 2015.

TECHNICAL FIELD OF THE DISCLOSURE

The present disclosure is generally related to seals and, more specifically, to a conformal seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about an axial centerline is disclosed, the seal comprising: a first seal section including a first base, a first leg extending from the first base and defining a first end, and a second leg extending from the first base and defining a second end; and a second seal section disposed adjacent the first seal section; wherein the first seal section includes a first plurality of slots extending from the first end to the first base and a second plurality of slots extending from the second end to the first base; and wherein the first seal section is configured to sealingly engage with the first and second components.

In a further embodiment of the above, the second seal section comprises a second base, a third leg extending from the second base and a fourth leg extending from the second base.

In a further embodiment of any of the above, the first and second seal sections are substantially C-shaped.

In a further embodiment of any of the above, a first protrusion is disposed on the first leg and located at a location selected from the group consisting of: at the first end and adjacent the first end; and a second protrusion is disposed on the second leg and located at a location selected from the group consisting of: at the second end and adjacent the second end; wherein the seal contacts a first surface of the first component at the first protrusion along a first single substantially circumferential line of contact; and wherein the seal contacts the second component at the second protrusion along a second single substantially circumferential line of contact.

In a further embodiment of any of the above, a third protrusion is disposed on the first seal section; wherein the seal contacts a second surface of the first component at the third protrusion along a first single substantially circumferential line of contact.

In a further embodiment of any of the above, the second seal section includes a third plurality of slots extending from the first end to the second base and a fourth plurality of slots extending from the second end to the second base.

In a further embodiment of any of the above, each of the first plurality of slots is circumferentially offset from each of the third plurality of slots; and each of the second plurality of slots is circumferentially offset from each of the fourth plurality of slots.

In a further embodiment of any of the above, the second seal section comprises a plurality of discrete arc segments disposed adjacent one another and defining a plurality of gaps therebetween.

In a further embodiment of any of the above, the base, the first leg and the second leg are each substantially C-shaped and the seal is substantially E-shaped.

In a further embodiment of any of the above, the first base, the first leg and the second leg are substantially co-linear, the second base, the third leg and the fourth leg are substantially co-linear, and further comprising: a first rounded end extending from the first leg and the third leg; and a second rounded end extending from the second leg and the fourth leg; wherein the seal contacts the first component at the first rounded end along a first single substantially circumferential line of contact; and wherein the seal contacts the second component at the second rounded end along a second single substantially circumferential line of contact.

In a further embodiment of any of the above, a first plurality of tabs are provided extending from the third leg and curving toward the first seal section; and a second plurality of tabs are provided extending from the second leg and curving toward the second seal section.

In a further embodiment of any of the above, the first base, the first leg and the second leg are substantially co-linear, the second base, the third leg and the fourth leg are substantially co-linear, and further comprising: a first rounded end extending from the first leg and wrapping around the third leg; and a second rounded end extending from the second leg and wrapping around the fourth leg wherein the seal contacts the first component at the first rounded end along a first single substantially circumferential line of contact; and wherein the seal contacts the second component at the second rounded end along a second single substantially circumferential line of contact.

In another embodiment, a system is disclosed, comprising: a first component including a first surface; a second component including a second surface, the second component disposed adjacent the first component and defining a seal cavity therebetween; wherein the first and second components are disposed about an axial centerline; and a seal disposed in the seal cavity, the seal including: a first seal section including a first base, a first leg extending from the first base and defining a first end, and a second leg extending from the first base and defining a second end; and a second seal section disposed adjacent the first seal section; wherein the first seal section includes a first plurality of slots extending from the first end to the first base and a second plurality of slots extending from the second end to the first base; wherein pressure within the seal cavity urges the seal to seat against the first surface and the second surface.

In a further embodiment of any of the above, the second seal section comprises a second base, a third leg extending from the second base and a fourth leg extending from the second base.

In a further embodiment of any of the above, a first protrusion is disposed on the first leg and located at a location selected from the group consisting of: at the first end and adjacent the first end; and a second protrusion is disposed on the second leg and located at a location selected from the group consisting of: at the second end and adjacent the second end; wherein the seal contacts the first component at the first protrusion along a first single substantially circumferential line of contact; and wherein the seal contacts the second component at the second protrusion along a second single substantially circumferential line of contact.

In a further embodiment of any of the above, the second seal section includes a third plurality of slots extending from the first end to the second base and a fourth plurality of slots extending from the second end to the second base.

In a further embodiment of any of the above, each of the first plurality of slots is circumferentially offset from each of the third plurality of slots; and each of the second plurality of slots is circumferentially offset from each of the fourth plurality of slots.

In a further embodiment of any of the above, the second seal section comprises a plurality of discrete arc segments disposed adjacent one another and defining a plurality of gaps therebetween.

In a further embodiment of any of the above, the first base, the first leg and the second leg are substantially co-linear, the second base, the third leg and the fourth leg are substantially co-linear, and further comprising: a first rounded end extending from the first leg and the third leg; and a second rounded end extending from the second leg and the fourth leg; wherein the seal contacts the first component at the first rounded end along a first single substantially circumferential line of contact; and wherein the seal contacts the second component at the second rounded end along a second single substantially circumferential line of contact.

In a further embodiment of any of the above, the first base, the first leg and the second leg are substantially co-linear, the second base, the third leg and the fourth leg are substantially co-linear, and further comprising: a first rounded end extending from the first leg and wrapping around the third leg; and a second rounded end extending from the second leg and wrapping around the fourth leg wherein the seal contacts the first component at the first rounded end along a first single substantially circumferential line of contact; and wherein the seal contacts the second component at the second rounded end along a second single substantially circumferential line of contact.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIGS. 6*a-b* are schematic cross-sectional views of a seal in an embodiment.

FIGS. 7*a-b* are schematic cross-sectional views of a seal in an embodiment.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
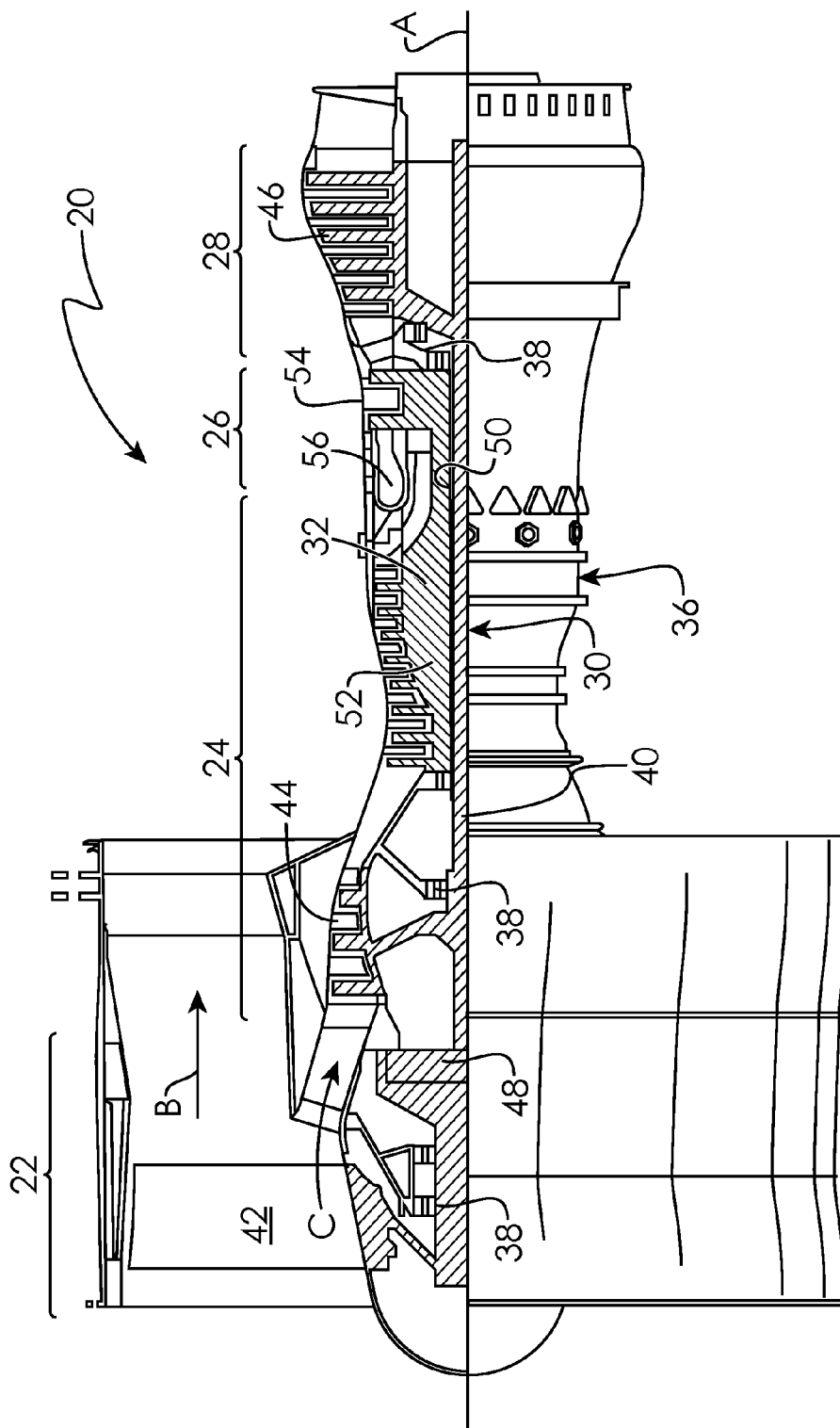
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
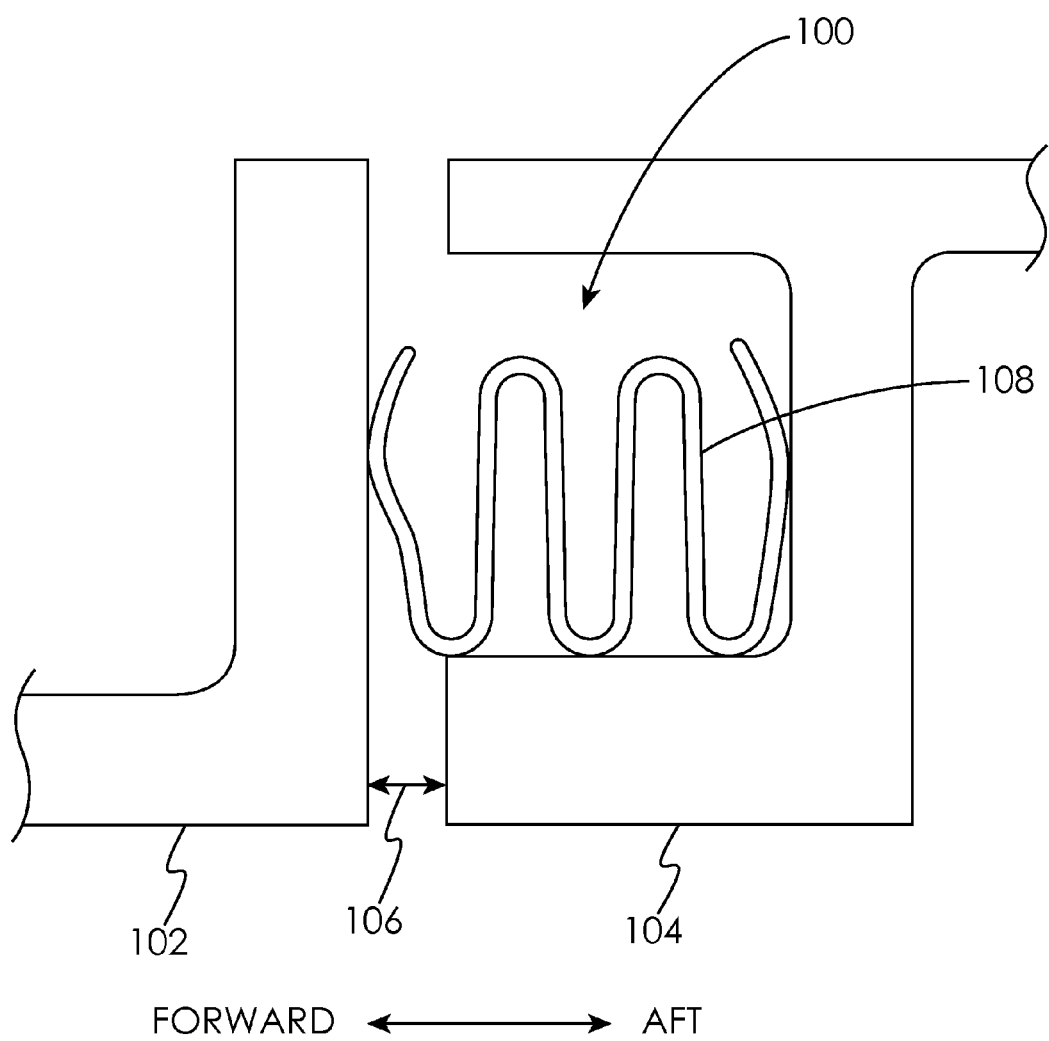
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform and wear excessively, causing it to become ineffective and potentially liberate.

Figure 3:
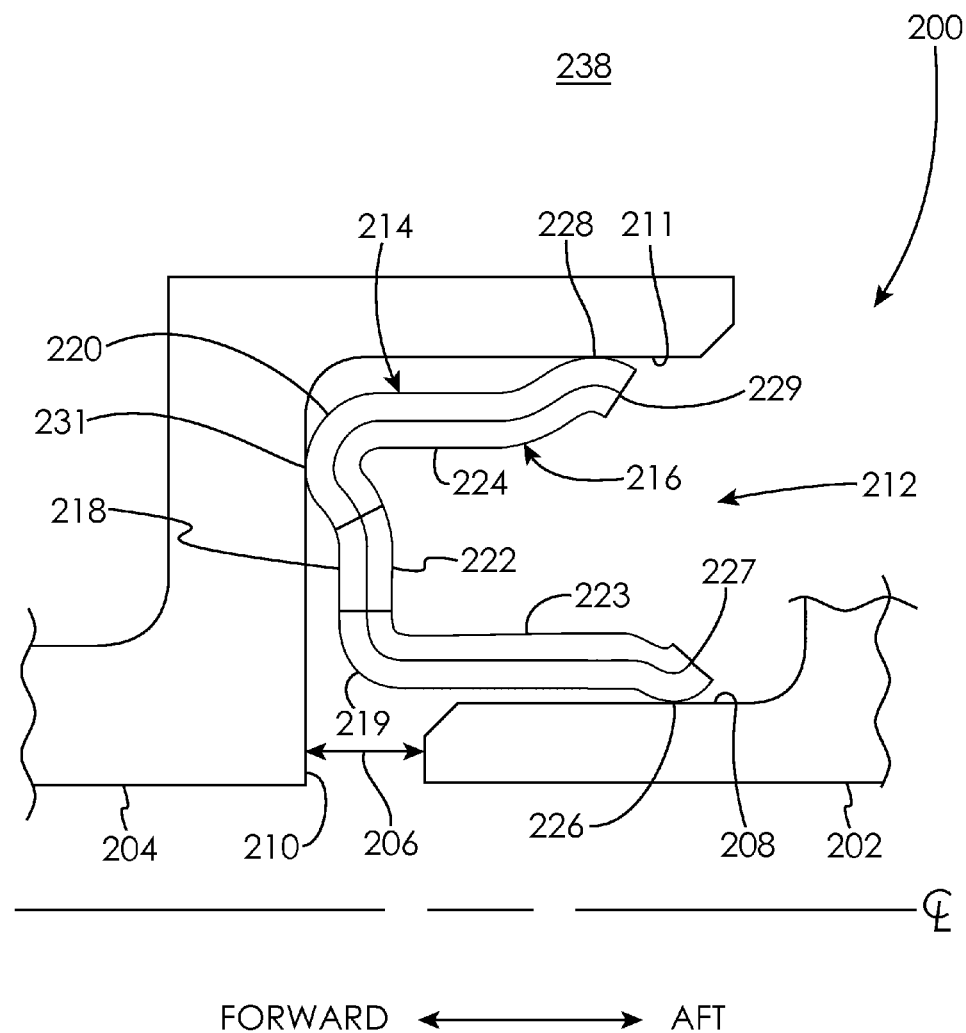
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. The seal 212 is formed from a first seal section 214 and a second seal section 216. The first seal section 214 is generally C-shaped and includes a base 218, an inboard leg 219 and an outboard leg 220. The second seal section 216 is also generally C-shaped and includes a base 222, an inboard leg 223 and an outboard leg 224. The seal 212 may include a coating and/or a sheath to provide increased wear resistance.

The seal section 214 may include a protrusion 226 in contact with the surface 208 at or adjacent a first end 227 of seal 212 such that the seal section 214 contacts the surface 208 along a single substantially circumferential line of contact. As used herein, the phrase "substantially circumferential line of contact" means lines that are circumferential but may include discontinuities therein, and also includes lines with a nominal radial or axial thickness. The seal section 214 also includes protrusion 228 in contact with the surface 211 at or adjacent a second end 229 of seal 212 such that the seal section 214 contacts the surface 211 along a single substantially circumferential line of contact. The contact surfaces defined by the protrusions 226, 228 are located at or near the ends 227, 229 of the seal 212 to maximize resilience as well as to maximize the pressure load applied to these contact surfaces. The seal section 214 also includes a protrusion 231 in contact with the surface 210 such that the seal section 214 contacts the surface 210 along a single substantially circumferential line of contact. This maximizes the differential pressure load acting on the seal 212 in the forward direction, and enables an axially-oriented inter-segment seal (e.g., a feather seal, not shown) in component 204 to be positioned at a known contact point.

Figure 4:
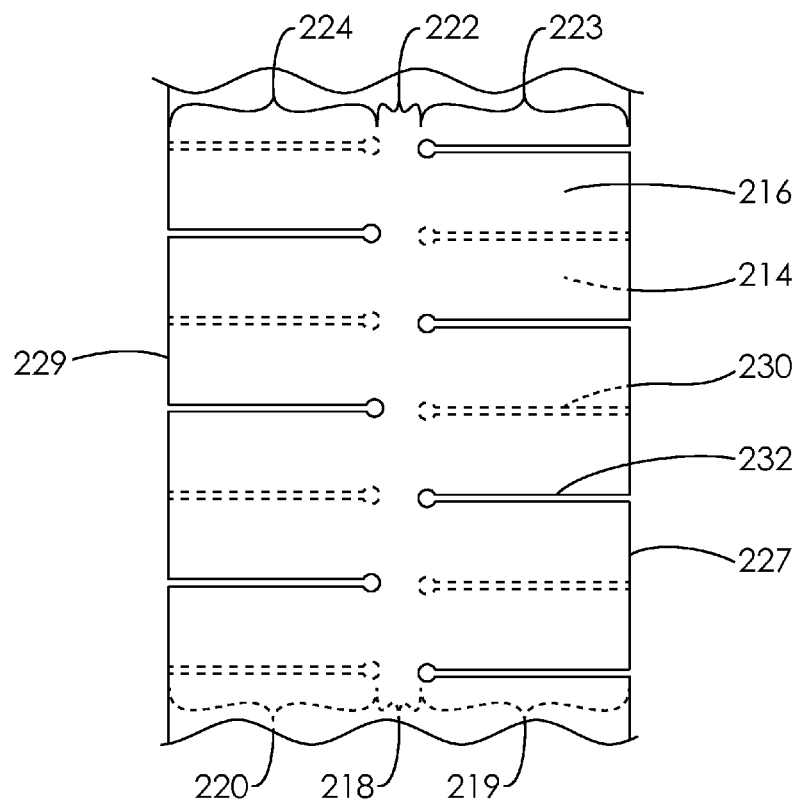
FIG. 4 is a schematic plan view of sheet material for forming a seal in an embodiment.
Figure 5A:
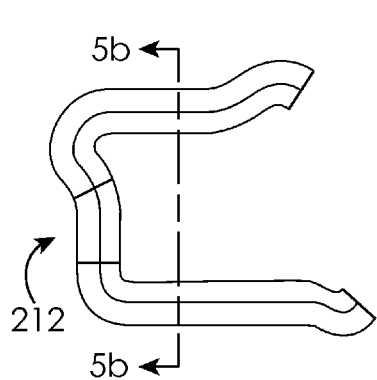
FIGS. 5*a-b* are schematic cross-sectional views of a seal in an embodiment.
Figure 5B:
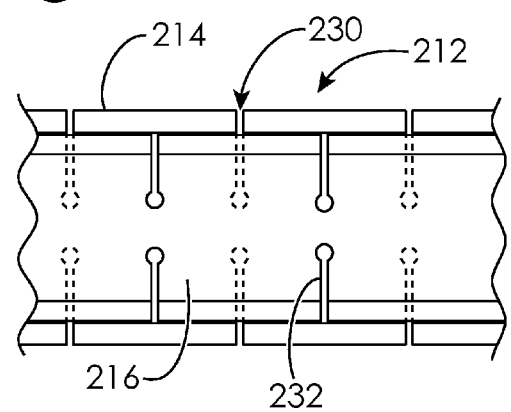

In an embodiment, the seal sections 214, 216 may be formed from sheet stock as shown in FIG. 4. The seal section 214 includes slots 230 formed across legs 219, 220 from each end 227, 229 of the seal 212 to the base 218. Similarly, the seal section 216 includes slots 232 formed across legs 223, 224 from each end 227, 229 of the seal 212 to the base 222. The bases 218, 222 are full hoop in an embodiment. In other embodiments, the bases 218, 222 each include a split at different circumferential locations. The slots 230, 232 create short arc-lengths within the legs 219, 220, 223 and 224 to enhance flexibility and resilience of the seal 212, while offsetting the positions of the slots 230 from the positions of the slots 232 substantially prevents gases from leaking through the seal 212. After the slots 230, 232 have been formed in the sheet stock of seal sections 214, 216, the sheet stock may be formed into the shape of the seal 212 as shown in FIGS. 5a-b.

A seal 212a is illustrated in FIGS. 6a-b in an embodiment and a seal 212b is illustrated in FIGS. 7a-b in an embodiment. The seals 212a, 212b are substantially identical to the seal 212 except that the seal section 216 is formed as a series of discrete arc segments 216a, 216b. Because of the gaps 234 between the arc segments 216a, 216b, the slots 232 may be eliminated. The use of arc segments 216a, 216b enables dissimilar materials to be used for the seal section 214 compared to the arc segments 216a, 216b without causing a ring-to-ring wear issue due to differences in thermal growths. In the seals 212a, 212b, a relatively low-strength material with better wear resistance may be used for the seal section 214, and a higher-strength material may be used for the arc segments 216a, 216b to achieve good resilience. In one embodiment, the seal section 214 may be formed from HAYNES 188 cobalt-base alloy and the arc segments 216a, 216b may be formed from WASPALOY nickel-base alloy, to name just one non-limiting example. Positioning and anti-rotation of the arc segments 216a, 216b may be achieved by any desired means, such as by locating dimple features (not shown) in the arc segments 216a, 216b to fit within key-hole features (not shown) formed in the seal section 214, to name just one non-limiting example.

Pressure in a secondary flow cavity 238 is transmitted to the seal cavity 200 through an opening defined by the components 202, 204. This pressure acts upon the surfaces of the seal sections 214, 216, thereby causing the inboard leg 219 to seat against the surface 208 of the component 202 and the outboard leg 220 to seat against the surfaces 210, 211 of the component 204. This prevents most or all of the secondary flow cavity 238 gases from reaching the design clearance 206 area and flow path. As the two components 202 and 204 move relative to each other in the axial and/or radial direction, the seal sections 214, 216 are free to slide relative to the components 202, 204 in the axial and circumferential directions, while the pressure forces acting upon the surfaces of the seal sections 214, 216 load the seal 212 so that it remains in contact with both components 202 and 204 as shown. Therefore, sealing is maintained while the components 202 and 204 and the components of the seal 212 move relative to one another. Because the seal sections 214, 216 slide with respect to the components 202, 204, the seal 212 is not substantially deflected by the relative axial movement between the components 202 and 204.

Figure 8:
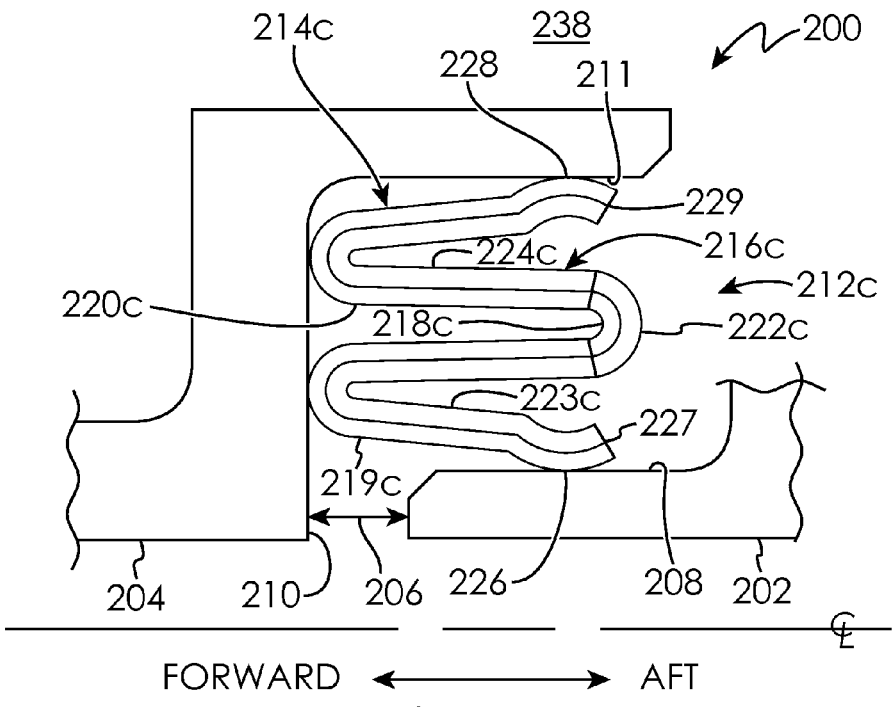
FIG. 8 is a schematic cross-sectional view of a seal and seal cavity in an embodiment.

Another embodiment of the seal 212 is illustrated in FIG. 8 and designated as 212c. The seal 212c is made substantially E-shaped by forming bases 218c and 222c, as well as the legs 219c, 220c, 223c and 224c, to be substantially C-shaped. Notwithstanding this, the seal section 214c seats against the surface 208 of the component 202 at protrusion 226, and against the surface 211 of the component 204 at protrusion 228. Seal section 214c also seats against the surface 210 of the component 204 at one or two locations. Forming the legs 219c, 220c, 223c and 224c to be substantially C-shaped enhances the flexibility and resiliency of the seal 212c.

Figure 9:
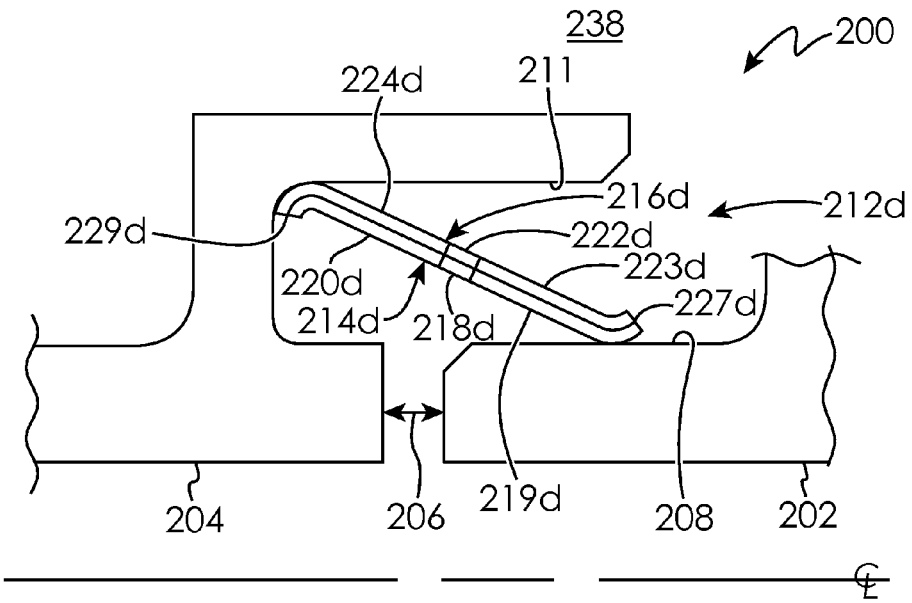
FIG. 9 is a schematic cross-sectional view of a seal and seal cavity in an embodiment.
Figure 10:
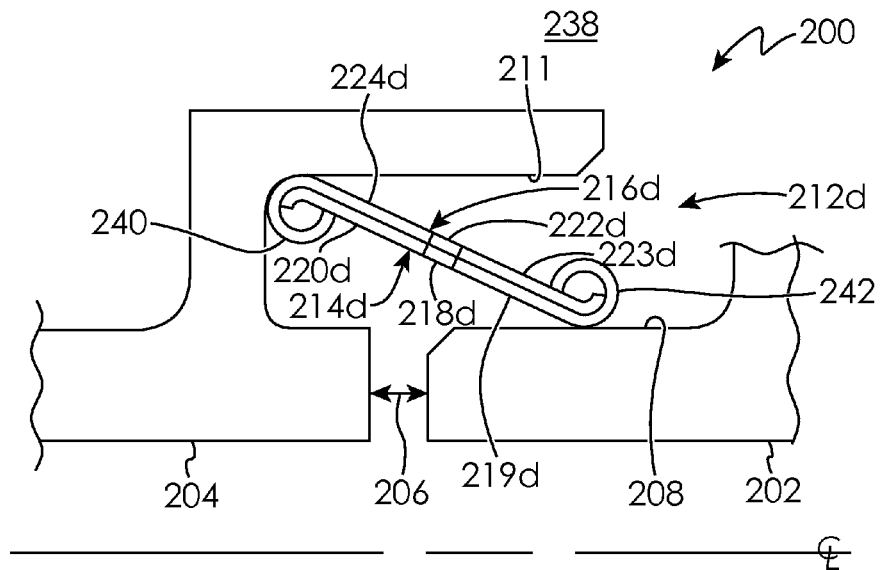
FIG. 10 is a schematic cross-sectional view of a seal and seal cavity in an embodiment.

Another embodiment of the seal 212 is illustrated in FIG. 9 and designated as 212d. The seal 212d is made substantially frustoconical by forming bases 218d and 222d, as well as the legs 219d, 220d, 223d and 224d, to be substantially linear in cross-section, with rounded ends 227d and 229d that contact the surfaces 208 and 211 along a single substantially circumferential line of contact. Forming the bases 218d and 222d, as well as the legs 219d, 220d, 223d and 224d, to be substantially linear allows use of the seal 212d where radial design space is very limited. The two layers of the seal 212d may be coupled together by any desired means, such as bonding them (e.g., by welding or brazing, to name just two non-limiting examples) at one or more locations around the circumference. An alternative embodiment is shown in FIG. 10, in which a plurality of tabs 240 extend from outboard leg 223d and curve toward outboard leg 223d, and a plurality of tabs 242 extend from inboard leg 219d and curve toward inboard leg 223d. The tabs 240, 242 are spaced around the circumference of the seal 212d.

Figure 11:
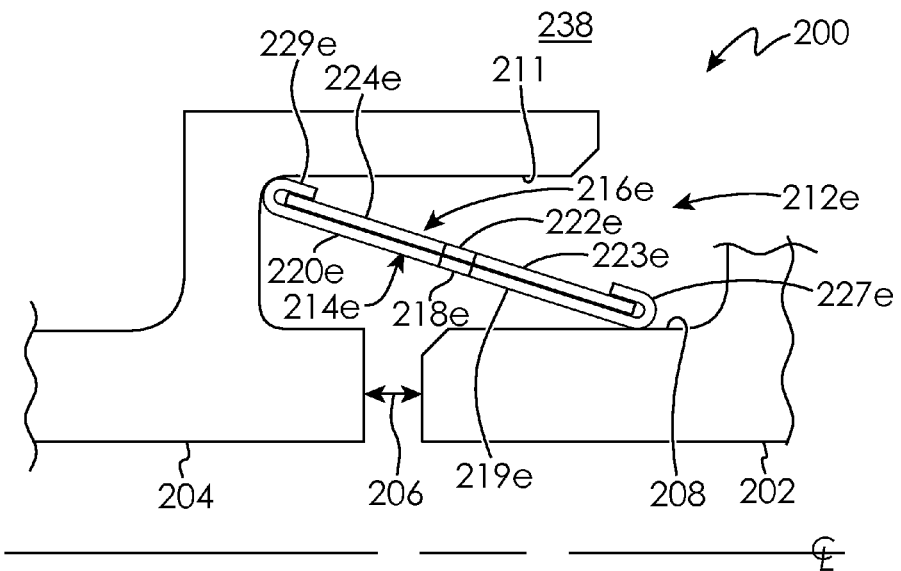
FIG. 11 is a schematic cross-sectional view of a seal and seal cavity in an embodiment.

Another embodiment of the seal 212 is illustrated in FIG. 11 and designated as 212e. The seal 212e is made substantially frustoconical by forming bases 218e and 222e, as well as the legs 219e, 220e, 223e and 224e, to be substantially linear in cross-section, with inboard leg 219e including an extending rounded end 227e that wraps around the inboard leg 223e, and with outboard leg 220e including an extending rounded end 229e that wraps around the outboard leg 223e, such that seal section 216e is mechanically retained by seal section 214e. The rounded ends 227e, 229e contact the surfaces 208 and 211 along a single substantially circumferential line of contact. The seal 212e may be used where radial design space is very limited. Furthermore, since the seal section 214e seals against both components 202, 204, the seal section 214e provides thermal and wear shielding for the seal section 216e. Therefore, the seal section 214e may be formed from a relatively wear resistant, relatively high temperature but relatively low strength material (e.g., a cobalt alloy to name just one non-limiting example), while the seal section 216e may be formed from a relatively resilient, relatively low temperature but relatively high strength material (e.g., WASPALOY to name just one non-limiting example).

Compared to the seal 108, the seal 212 legs have the ability to partially conform to stair-stepped and/or chorded interfaces in the components 202, 204. Where a combination of two different materials is used for the seal sections 214, 216, the seal 212 exhibits better wear resistance because a more lubricous material may be used for the seal section 214 and a higher-strength material may be used for the seal section 216. Additionally, where a combination of two different materials is used for the seal sections 214, 216, the seal 212 exhibits better temperature resistance because a material with higher temperature capabilities and high ductility may be used for the seal section 214 and a higher-strength material may be used for the seal section 216. Furthermore, the seal 212 exhibits improved vibration tolerance due to friction damping. Finally, the seal 212 contacts radial surfaces of the components 202, 204 rather than axial surfaces like the w-seal 108, which may result in reduced leakage past the seal and/or enable use of simpler geometries for the components 202, 204.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second adjacent components disposed about an axial centerline, the seal comprising:
a first seal section including a first base, a first leg extending from the first base and defining a first distal end, and a second leg extending from the first base and defining a second distal end; and
a complimentary second seal section disposed adjacent the first seal section, the second seal section including a second base, a third leg extending from the second base and a fourth leg extending from the second base;
wherein the first seal section includes a first plurality of slots extending from the first end to the first base and a second plurality of slots extending from the second end to the first base;
wherein the second seal section includes a third plurality of slots extending from the first end to the second base and a fourth plurality of slots extending from the second end to the second base;
wherein each of the first plurality of slots is circumferentially offset from each of the third plurality of slots and each of the second plurality of slots is circumferentially offset from each of the fourth plurality of slots;
wherein the first seal section is configured to sealingly engage with the first and second components;
a first protrusion disposed on the first leg and located at the first distal end;
a second protrusion disposed on the second leg and located at the second distal end;
a third protrusion disposed on the first seal section;
wherein the seal contacts a first surface of the first component at the first protrusion along a first single substantially circumferential line of contact;
wherein the seal contacts the second component at the second protrusion along a second single substantially circumferential line of contact; and
wherein the seal contacts a second surface of the first component at the third protrusion along a third single substantially circumferential line of contact.

2. The seal of claim 1, wherein the first and second seal sections are substantially C-shaped.

3. A seal for sealing a space defined by first and second adjacent components disposed about an axial centerline, the seal comprising:
a first seal section including a first base, a first leg extending from the first base and defining a first distal end, and a second leg extending from the first base and defining a second distal end;
a complimentary second seal section disposed adjacent the first seal section;
wherein the first seal section includes a first plurality of slots extending from the first end to the first base and a second plurality of slots extending from the second end to the first base;
wherein the first seal section is configured to sealingly engage with the first and second components;
wherein the second seal section comprises a plurality of discrete arc segments disposed adjacent one another and defining a plurality of gaps therebetween;
wherein the plurality of gaps extend from the first end to the second end and are offset from each of the plurality of slots;
a first protrusion disposed on the first leg and located at the first distal end;
a second protrusion disposed on the second leg and located at the second distal end;
a third protrusion disposed on the first seal section;
wherein the seal contacts a first surface of the first component at the first protrusion along a first single substantially circumferential line of contact; and
wherein the seal contacts the second component at the second protrusion along a second single substantially circumferential line of contact; and
wherein the seal contacts a second surface of the first component at the third protrusion along a third single substantially circumferential line of contact.

4. The seal of claim 1, wherein the base, the first leg and the second leg are each substantially C-shaped and the seal is substantially E-shaped.

5. The seal of claim 1, wherein the first base, the first leg and the second leg are substantially co-linear, the second base, the third leg and the fourth leg are substantially co-linear, and wherein the first protrusion is a first rounded end extending from the first leg and the second protrusion is a second rounded end extending from the second leg and wherein the third leg has a rounded end located proximate to the first rounded end and the fourth leg has a rounded end located proximate to the second rounded end.

6. The seal of claim 5, further comprising:
a first plurality of tabs extending from the third leg and curving toward the first seal section; and
a second plurality of tabs extending from the second leg and curving toward the second seal section.

7. The seal of claim 1, wherein the first base, the first leg and the second leg are substantially co-linear, the second base, the third leg and the fourth leg are substantially co-linear, and wherein the first protrusion is a first rounded end extending from the first leg and wrapping around the third leg; and the second protrusion is a second rounded end extending from the second leg and wrapping around the fourth leg.

8. A system, comprising:
a first component including a first surface;
a second component including a second surface, the second component disposed adjacent the first component and defining a seal cavity therebetween;
wherein the first and second components are disposed about an axial centerline; and
a seal disposed in the seal cavity, the seal including:
a first seal section including a first base, a first leg extending from the first base and defining a first end, and a second leg extending from the first base and defining a second end; and
a complimentary second seal section disposed adjacent the first seal section, the second seal section including a second base, a third leg extending from the second base and a fourth leg extending from the second base;
wherein the first seal section includes a first plurality of slots extending from the first end to the first base and a second plurality of slots extending from the second end to the first base;
wherein the second seal section includes a third plurality of slots extending from the first end to the second base and a fourth plurality of slots extending from the second end to the second base;

wherein each of the first plurality of slots is circumferentially offset from each of the third plurality of slots and each of the second plurality of slots is circumferentially offset from each of the fourth plurality of slots;
wherein pressure within the seal cavity urges the seal to seat against the first surface and the second surface;
a first protrusion disposed on the first leg and located at the first distal end;
a second protrusion disposed on the second leg and located at the second distal end;
a third protrusion disposed on the first seal section;
wherein the seal contacts a first surface of the first component at the first protrusion along a first single substantially circumferential line of contact;
wherein the seal contacts the second component at the second protrusion along a second single substantially circumferential line of contact; and
wherein the seal contacts a second surface of the first component at the third protrusion along a third single substantially circumferential line of contact.

9. The seal of claim 8, wherein the first base, the first leg and the second leg are substantially co-linear, the second base, the third leg and the fourth leg are substantially co-linear, wherein the first protrusion is a first rounded end extending from the first leg and second protrusion is a second rounded end extending from the second leg and wherein the third leg has a rounded end located proximate to the first rounded end and the fourth leg has a rounded end located proximate to the second rounded end.

10. The seal of claim 8, wherein the first base, the first leg and the second leg are substantially co-linear, the second base, the third leg and the fourth leg are substantially co-linear, wherein the first protrusion is a first rounded end extending from the first leg and wrapping around the third leg; and the second protrusion is a second rounded end extending from the second leg and wrapping around the fourth leg.

* * * * *